United States Patent [19]

Rupp

[11] Patent Number: 4,687,168
[45] Date of Patent: Aug. 18, 1987

[54] MOBILE RADIO ANTENNA SUPPORT DEVICES

[76] Inventor: Herbert E. Rupp, 4761 Anchor Ave., Port Salerno, Fla. 33492

[21] Appl. No.: 12,288

[22] Filed: Feb. 9, 1987

[51] Int. Cl.$^4$ .............................................. A01K 97/10
[52] U.S. Cl. .................................. 248/539; 343/709; 343/882
[58] Field of Search .............. 248/518, 534, 535, 538; 343/892, 713

[56] References Cited

U.S. PATENT DOCUMENTS

| | | | |
|---|---|---|---|
| 3,134,978 | 5/1964 | Arvay | 343/882 X |
| 3,208,702 | 9/1965 | Rowe | 343/709 |
| 3,357,663 | 12/1967 | Ivy | 343/709 X |
| 3,521,285 | 7/1970 | Mautner | 343/709 |
| 3,886,560 | 5/1975 | Mortensen | 343/882 |
| 4,152,704 | 5/1979 | Burg | 343/709 |
| 4,505,006 | 3/1985 | Andre | 248/56 X |
| 4,630,415 | 12/1986 | Attwell | 248/56 X |
| 4,640,478 | 2/1987 | Leigh-Monstevens | 248/56 |

*Primary Examiner*—J. Franklin Foss
*Attorney, Agent, or Firm*—Carroll F. Palmer

[57] ABSTRACT

A device for use in mounting on a boat or other mobile unit a radio antenna of the whip type includes a support member and a collar member. The support member has a partial ring portion with a side opening and an integral mount extending laterally from the side of the partial ring portion opposite to the opening by which the support member may be fixed to a support surface. The inside surface of the ring portion is tapered inwardly along its length. The collar member includes a tubular body having a bore of diameter approximating the diameter of the cylindrical base portion of the antenna and a plurality of integral fingers depend inwardly from its lower end. On the outside of the collar member is a tapered section having an angle of taper matching that of the taper in the support member so the collar member may nest in the support member. A lug extends laterally from the lower end of the tubular body which serves to lock the tubular body in the support member when nested therein by engagement with the partial ring portion of the support member.

7 Claims, 5 Drawing Figures

MOBILE RADIO ANTENNA SUPPORT DEVICES

BACKGROUND OF THE INVENTION

1. Field of the Invention

This invention relates broadly to support devices for mobile radio antenna. More particularly, it concerns improvements in hardware with which to mount radio antenna onboats, RV vehicles or like mobile units.

2. Description of the Prior Art

A widely used form of antenna for radio reception and trnasmission on boats or other mobile units, generally referred to as a whip antenna, comprises a base portion which is firmly mounted on some portion of the mobile unit and a free-standing rod-like portion that extends from the base portion. To be effective, the base portion must be so securely mounted that the antenna will remain in its proper position against the wind and motion forces to which it will be subjected during operation of the mobile unit. Such adverse forces can be quite substantial, e.g., when the boat on which the antenna is mounted is pounding into rough seas causing its free-standing portion to whip violently fore and aft.

In addition to securely supporting the antenna against the indicated adverse conditions, acceptable mounting hardware for mobile radio antenna mounting should meet several other requirements. For example, such hardware should enable the antenna to be quickly unmounted for any reason, e.g., to permit a boat to pass under a bridge.

Another requirement is for the mounting hardware to compensate for minor size variations in the base portion of the antenna that exist due to dimension tolerances needed to permit the antenna to be produced at customer acceptable costs. Thus, the hardware must handle such minor size variation problems and still provide the strong, stable support demanded by the above mentioned adverse conditions.

A variety of mobile radio antenna mounting hardware designs have been developed in the past, for example, see U.S. Pat. Nos. 3,208,702; 3,357,663 and 4,244,716. The present invention makes further improvements in this class of product to better meet the demands and requirements connected therewith as discussed above.

OBJECTS

A principal object of the invention is the provision of new, improved forms of devices for mounting radio antenna on boats or other mobile units.

Further objects include the provision of:

1. A new type of mounting hardware capable of securely holding whip-type mobile radio antenna and keeping same in proper position against adverse conditions which the antenna will encounter during use.
2. Such hardware that permits the antenna to be quickly unmounted as required.
3. Such hardware that effectively compensates for size variations that exist in radio antenna as a result of manufacturing tolerances.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

The objects are accomplished in accordance with the invention by the provision of a device for use in mounting on a boat or other mobile unit a radio antenna of the whip type including an elongated cylindrical base portion. Such device consists of a support member and a collar member.

The support member comprises a partial ring portion having an inside surface, an outside surface, and a side opening. An integral means extends laterally from the side of the partial ring portion opposite to the opening by which the support member may be fixed to a support surface.

The inside surface of the ring portion is tapered inwardly along its length.

The collar member comprises a tubular body having upper and lower ends opening into a bore of diameter approximating the diameter of the cylindrical base portion of the antenna. A plurality of integral fingers depend inwardly from its lower end.

There is an outside tapered section on the collar member that is at least as long as the length of the inside surface of the support member ring portion. This has an angle of taper matching that of the inside surface whereby the collar member may nest in the support member.

A lug extends laterally from the lower end of the tubular body which serves to lock the tubular body in the support member when nested therein by engagement with the partial ring portion.

In preferred embodiments, the collar member has gripping projections extending laterally outwardly thereof between said upper end and said outside tapered section to assist in turning it so the lug will lock it in place on the support member.

In one embodiment, the integral means of the support member is a pedestal comprising a web extending laterally from its partial ring portion and there is an oblong plate member fixed transversally to such web providing a flat surface for engagement with any flat support surface. Such plate member is provided with openings therein through which fasteners may extend.

In another embodiment, the integral means of the support member comprises a columnar member with an outside threaded male end and there is an annular ledge positioned between such threaded male end and the partial ring portion to limit the distance the male end may be threaded into a threaded female receptacle.

BRIEF DESCRIPTION OF THE DRAWINGS

A more complete understanding of the invention may be had by reference to the accompanying drawings in which.

DESCRIPTION OF THE PREFERRED EMBODIMENTS

Figure 2:
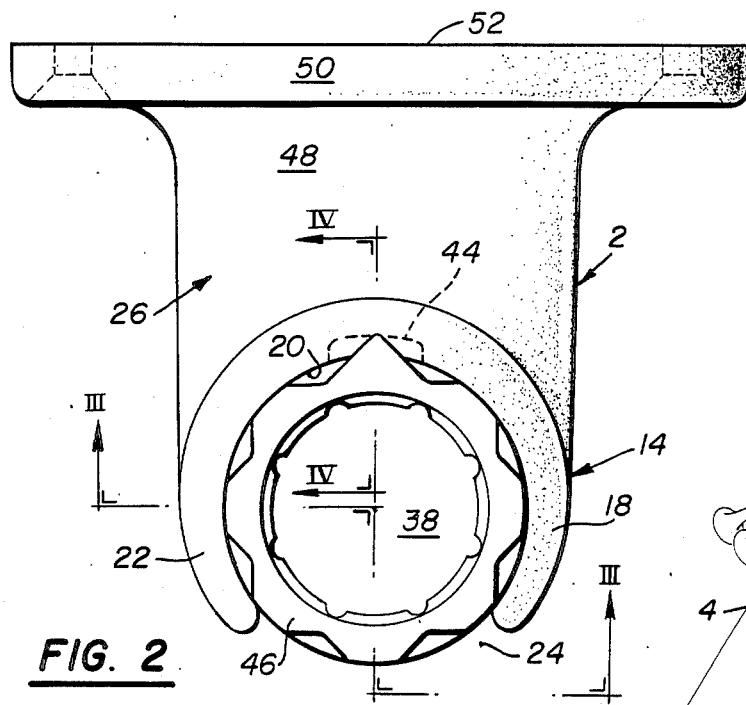
FIG. 2 is a plan view of one embodiment of antenna mounting hardware of the invention.

Referring in detail to the drawings, in which identical parts are identically marked, the invention concerns a device 2 for use in mounting on a boat 4 or other mobile unit a radio antenna 6 of the whip type including an elongated cylindrical base portion 8 and a free-standing rod-like portion 10 that extends from the base portion 8. In addition to the new mounting device of the invention, the mounting hardware for the antenna 6 will typically include a bottom end stand-off mount 12.

The device 2 comprises a support member 14 and a collar member 16.

The support member 14 includes a partial ring portion 18 having an inside surface 20, an outside surface 22, a side opening 24, and integral means 26 extending laterally from the side of the partial ring portion 18 opposite to the opening 24 by which the support member may be fixed to the support surface 28. The inside surface 20 tapers inwardly along its length 30.

The collar member 16 includes a tubular body 32 having upper end 34 and lower end 36 both opening into a bore 38 of diameter approximating the diameter of the cylindrical base portion 8 of antenna 6.

A plurality of integral fingers 40 depend inwardly from the lower end 36 and there is an outside tapered section 42 at least as long as the length of the inside surface 20 which has an angle of taper matching that of the inside surface 20 whereby the collar member 16 may nest in the support member 14.

A lug 44 extends laterally from the lower end 36 of the tubular body 32 which serves to lock it in the support member 14 when nested therein by engagement with the partial ring portion 18.

Gripping projections 46 extend laterally outwardly from the body 32 between its upper end 34 and the outside tapered section 42.

In the embodiment of FIGS. 1-4, the integral member 26 is in the form of a pedestal comprising a web 48 extending laterally from the partial ring portion 18 and an oblong plate member 50 fixed transversally to web 48 providing a flat surface 52 for engagement with the support surface 28. Plate member 50 has openings 54 therein through which fasteners (not shown) may extend.

Figure 5:
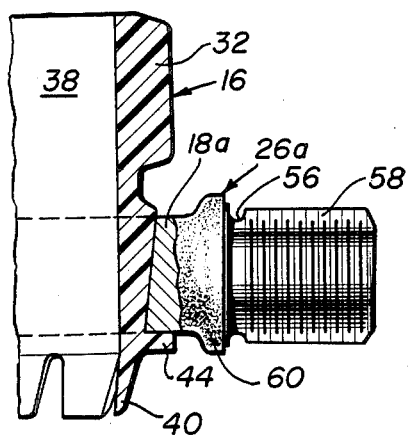
FIG. 5 is a fragmentary sectional view similar to FIG. 4 showing another embodiment of the invention.

In the embodiment of FIG. 5, the integral member 26a comprises a columnar member 56 having an outside threaded male end 58 and an annular ledge 60 positioned between male end 59 and the partial ring portion 18a to limit the distance said male end may be threaded into a threaded female receptacle (not shown). The size and threading of the male end sould be according the industry standard so as to be usable with female receptacle commercially available as boat and RV hardware.

Figure 1:
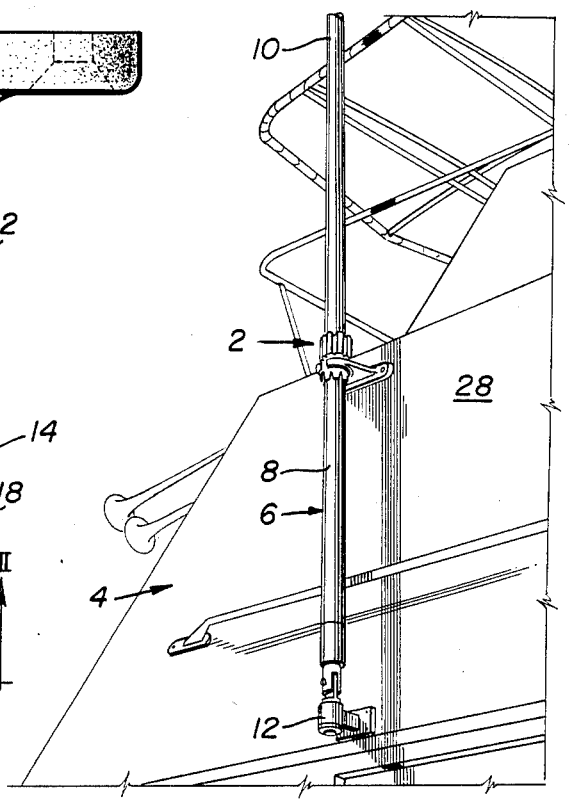
FIG. 1 is a fragmentary perspective view of a VHF boat antenna mounted to the topsides of a boat with hardware of the invention.
Figure 3:
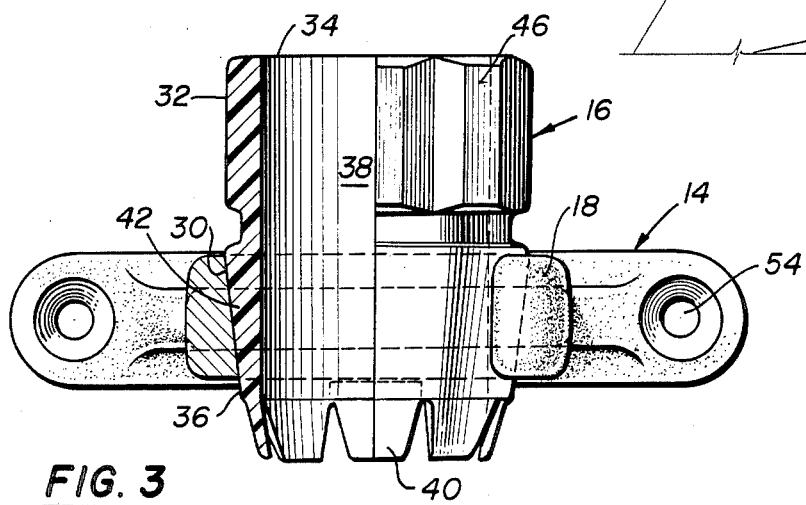
FIG. 3 is a sectional view taken on the line III—III Of FIG. 2.
Figure 4:
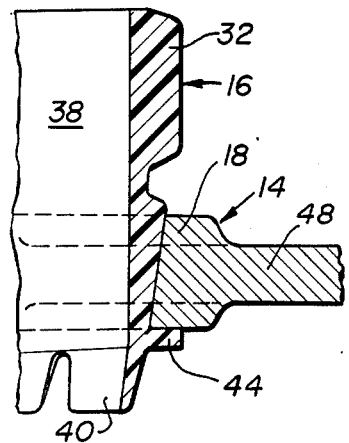
FIG. 4 is a fragmentary sectional view taken on the line IV—IV of FIG. 2.

When properly installed, e.g., see FIG. 1, the new devices 2 of the invention permit whip antennas to be so securely mounted that the antenna will remain in its proper position against the wind and motion forces to which it will be subjected during operation of the mobile unit, e.g., when the boat 4 on which the antenna 6 is mounted is pounding into rough seas causing tis freestanding portion 10 to whip violently fore and aft. Nevertheless, the device 2 permits the antenna 6 to be quickly lowered when necessary, e.g., to allow the boat 4 to pass under a bridge. This is accomplished by turning the collar member 16 until the lug 44 enters the opening 24. Then, the member 16 is lifted until it is clear of the support member 14 allowing the antenna portion 8 to pass through the opening 24 and clear the device 2 so the antenna may be lowered.

The fingers 40 assist in securely holding the antenna 6 even when manufacturing tolerances may permit the antenna portion 8 to be slightly undersized.

The embodiments of the invention in which an exclusive property or privilege is claimed are defined as follows:

1. A device for use in mounting on a boat or other mobile unit a radio antenna of the whip type including an elongated cylindrical base portion which comprises:
    a support member and a collar member,
    said support member including:
        a partial ring portion having an inside surface, an outside surface, and a side opening, and
        integral means extending laterally from the side of said partial ring portion opposite to said opening by which said support member may be fixed to a support surface,
        said inside surface being tapered inwardly along its length,
    said collar member including:
        a tubular body having upper and lower ends opening into a bore of diameter approximating the diameter of said cylindrical base portion,
        a plurality of integral fingers depending inwardly from said lower end,
        an outside tapered section at least as long as said length of said inside surface and having an angle of taper matching that of said inside surface whereby said collar member may nest in said support member, and
        a lug extending laterally from said lower end of said tubular body which serves to lock said tubular body in said support member when nested therein by engagement with said partial ring portion.

2. The device of claim 1 wherein said collar member has gripping projections extending laterally outwardly thereof between said upper end and said outside tapered section.

3. The device of claim 1 wherein said integral means is a pedestal comprising:
    a web extending laterally from said partial ring portion and
    an oblong plate member fixed transversally to said web providing a flat surface for engagement with said support surface.

4. The device of claim 3 wherein said plate member has openings therein through which fasteners may extend.

5. The device of claim 1 wherein said integral means comprises:
    a columnar member having an outside threaded male end and
    an annular ledge positioned between said threaded male end and said partial ring portion to limit the distance said male end may be threaded into a threaded female receptacle.

6. A device for use in mounting on a boat or other mobile unit a radio antenna of the whip type including an elongated cylindrical base portion which comprises:
    a support member and a collar member,
    said support member including:
        a partial ring portion having an inside surface, an outside surface, and a side opening, and integral means extending laterally from the side of said partial ring portion opposite to said opening by which said support member may be fixed to a support surface, said inside surface being tapered inwardly along its length, said collar member including:

a tubular body having upper and lower ends opening into a bore of diameter approximating the diameter of said cylindrical base portion, a plurality of integral fingers depending inwardly from said lower end, an outside tapered section at least as long as said length of said inside surface and having an angle of taper matching that of said inside surface whereby said collar member may nest in said support member, a lug extending laterally from said lower end of said tubular body which serves to lock said tubular body in said support member when nested therein by engagement with said partial ring portion, and gripping projections extending laterally outwardly thereof between said upper end and said outside tapered section.

7. The device of claim 6 wherein said integral means is a pedestal comprising:

a web extending laterally from said partial ring portion and an oblong plate member fixed transversally to said web providing a flat surface for engagement with said support surface.

* * * * *